United States Patent

Palmskog et al.

[11] Patent Number: 5,930,438
[45] Date of Patent: Jul. 27, 1999

[54] METHOD FOR MANUFACTURING AN OPTOELECTRICAL COMPONENT AND AN OPTOELECTRICAL COMPONENT MANUFACTURED ACCORDING TO THE METHOD

[75] Inventors: Göran Palmskog, Järfälla; Olle Jonny Hagel; Göran Gustafsson, both of Linköping; Paul Eriksen, Tyresö, all of Sweden

[73] Assignee: Telefonaktiebolaget LM Ericsson, Stockholm, Sweden

[21] Appl. No.: 08/931,304

[22] Filed: Sep. 16, 1997

[30] Foreign Application Priority Data

Sep. 17, 1996 [SE] Sweden ................................. 9603383

[51] Int. Cl.$^6$ ....................................... G02B 6/10
[52] U.S. Cl. ......................... 385/129; 385/130; 385/131
[58] Field of Search ..................... 385/129, 130, 385/131, 132, 122–128

[56] References Cited

U.S. PATENT DOCUMENTS 5,291,574   3/1994   Levenson et al. ...................... 385/129

FOREIGN PATENT DOCUMENTS 0 504 882   9/1992   European Pat. Off. .

*Primary Examiner*—Phan T. H. Palmer
*Attorney, Agent, or Firm*—Burns, Doane, Swecker & Mathis, L.L.P.

[57] ABSTRACT

The optoelectrical components which up to now have been used in the fibre-optical region have had waveguides of quartz and glass with hermetic encapsulating, which components have had too high manufacturing costs for profitable use. Through making polymeric single mode (SM) waveguides from plastic, for example, benzocyclobutene polymer (BCB) a simple reliable and inexpensive concept for making waveguides can be obtained. Two of the commercially available grades of BCB/DOW Chemicals have furthermore a refractive index difference which permits manufacturing of buried waveguides with SM characteristics. These two types of BCB material have shown themselves to be especially usable for manufacturing of so-called buried SM waveguides: a heat curable grade (1,4) used for under- and over-cladding for waveguides and a photodefinable derivative (3) used as the waveguide material. Encapsulating of a waveguide chip can in this way be made with plastics, at the same time as the connector interface can be formed in the end surfaces of the components.

5 Claims, 2 Drawing Sheets

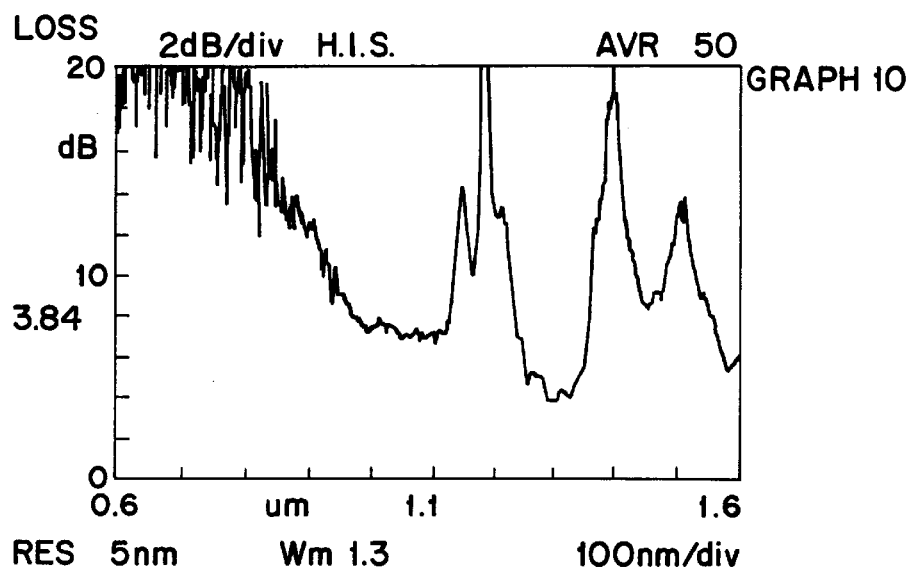
Fig. 4
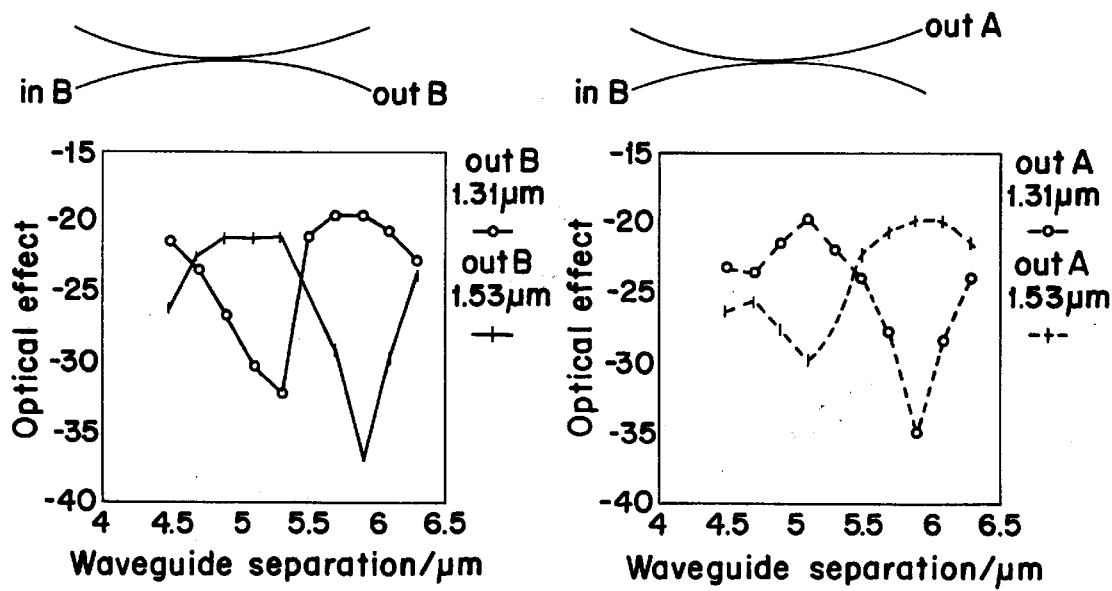
Fig. 5A
Fig. 5B

METHOD FOR MANUFACTURING AN OPTOELECTRICAL COMPONENT AND AN OPTOELECTRICAL COMPONENT MANUFACTURED ACCORDING TO THE METHOD

FIELD OF THE INVENTION

The present invention relates to a method for manufacturing an optoelectrical component and an optoelectrical component manufactured according to the method, where the optoelectrical component's wave guide can be made of plastic and be enveloped in plastic.

STATE OF THE ART

The introduction of new types of interactive multimedia services has increased the requirement for a substantially increased capacity on existing telecommunication network infrastructures, which is impossible to achieve without a wide use of fibreoptics in connecting, transporting, accessing, and in system equipment. Waveguide technology at a low cost is one of the most important regions which should be able to contribute to the breakthrough for optical solutions. Up to now silicon on silicon generally has been used as a waveguide material in telecommunication applications. A complete accomplishment of a low cost and a large volume scenario, however, requires the introduction of only low cost processes in a few steps, which only could be realized through the use of polymer material.

DISCLOSURE OF THE INVENTION

Up to now optical components with waveguides made of plastic have not been able to achieve the highly demanding specifications which have, for example, been required for access components with waveguides made of quartz and glass. Optical components, both passive and active, would have a large influence on the development of access and data communication applications if they were not so expensive to manufacture. The optoelectrical components which at present have been commercialized within the fibreoptic region have been based on waveguides of quartz and crystal with hermetic encapsulating, which has often given too high costs for volume production.

Through making polymeric single mode (SM) waveguides of benzo cyclobutene polymer (BCB) it is possible to obtain a simple, reliable and inexpensive concept for making waveguides. Two of the commercially available grades of BCB have furthermore a refractive index difference which permits the manufacturing of buried waveguides with SM characteristics. The now commercially available material BCB exists under the name of Cyclotene™, which is a relatively new material from Dow Chemical and in the first instance was developed and intended for dielectric layers in microelectronic applications. The BCB material has extremely good dielectric characteristics, low moisture absorption, better planarisation characteristics, better thermostability and lower shrinkage compared with polyimides. Two types of BCB material have especially shown themselves to be usable for the manufacturing of buried SM waveguides. A heat curing grade is used for the under and over cladding of waveguides, and a photo definable derivative called photo BCB is used as waveguide material. Encapsulating of a waveguide chip can in this way be made with plastic, at the same time as the connector interface could be formed in the end surfaces of the components.

With this waveguide concept it is possible to achieve a large development potential for the manufacturing of inexpensive optoelectrical components, where the waveguide can be connected to active components such as PIN and laser diodes in order to, for example, make transceiver modules. Through developing the concept for manufacturing of optical active and passive components with BCB waveguide technology, a number of difficult steps in the development can be reduced to a manageable number in order to then develop commercially interesting products such as optical splitters and WDM filter modules with MT interfaces at both ends.

The use of an MT connection interface of the "retainer" type according to the invention makes it possible to obtain low manufacturing cost and larger compactness compared with, for example, so-called pigtail construction.

At the same time the new manufacturing technology for large volumes at a low cost must be brought into focus. Therefore, for these purposes, competence must be built up for injector moulding and transfer pressing of small plastic details in large volumes with extremely tight tolerances. The potential reliability problems with, in the first instance, the active components could in this way be solved at a later stage, when the plastic materials process and device compatibility problems would be better known.

DESCRIPTION OF THE FIGURES

FIG. 4 shows a damping curve for a BCB waveguide 6 Tm, 3.6 cm long.

FIGS. 5A and B show an optical evaluation of a directional coupler.

DESCRIPTION OF A PREFERRED EMBODIMENT

Figure 1:
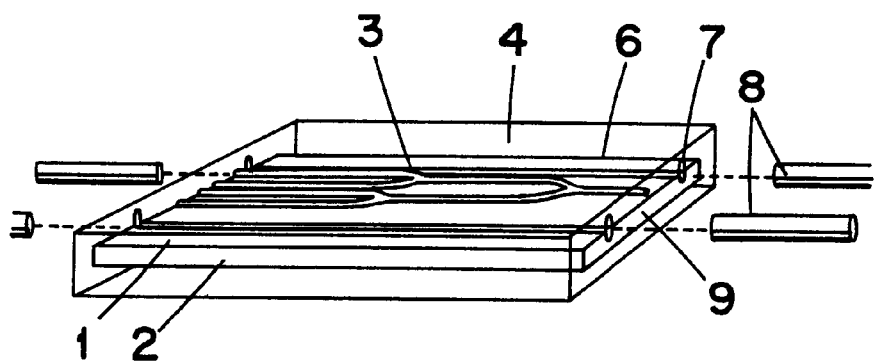
FIG. 1 shows simplified a power splitter module according to the invention.
Figure 2:
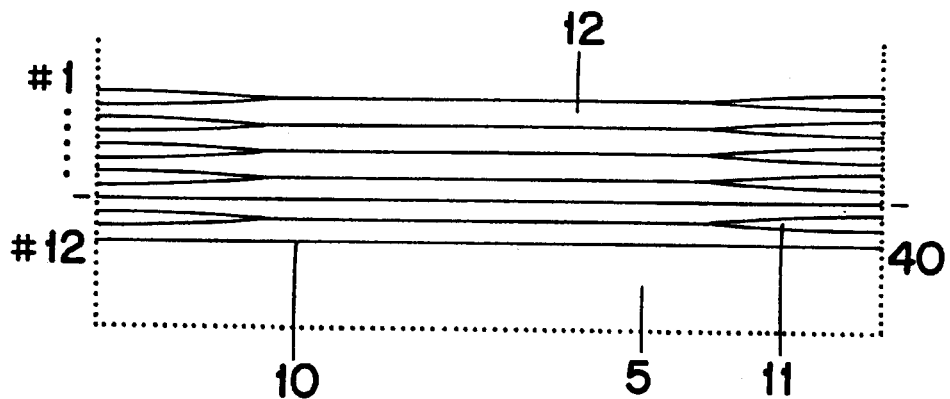
FIG. 2 shows a part of an E-beam mask for waveguide production.

The method for producing an optoelectrical component according to the invention, i.e. the technology itself of forming it, is based upon the manufacturing of single mode waveguides from BCB and on the encapsulating of these with a simultaneous passive alignment. The process flow for the manufacturing of an SM-BCB waveguide will be described first here:

The waveguide structure in a power splitter module according to FIG. 1 can consist firstly of a bottom-cladding 1 of a BCB (without antioxidant) on a substrate 2 such as a 1.3 mm thick silicon disc, then a core of a photo patternable BCB (Cyclotene 4024-40) 3 and an over-cladding of a BCB (without antioxidant) 4. The bottom- or under-cladding 1 is applied through spin deposition of BCB without antioxidant XU 13005.19, 1200 rpm, 10 Tm on the silicon disc 2, followed by "soft baking" in a disc oven in a nitrogen gas atmosphere with a special program. The core 3 is made through spin deposition of Cyclotene 4024-40 at 3000 rpm, 5 Tm and then prebaking in a convention oven at a temperature of 90☐ for 10 minutes followed by exposure in curing contact with an E-beam manufactured lithographic mask 5, see FIG. 2, for forming the waveguide pattern. Developing takes place with DS3000 at a temperature of 30☐C for 15 minutes and is followed by rinsing with a soap and water solution. Drying takes place on a spinner or a rinser and dryer. The following soft baking can take place in a disc oven in a nitrogen atmosphere according to a special IMC baking program. The over-cladding 4 takes place through spin deposition of BCB without antioxidant XU 13005.01, at 1200 rpm, 10 Tm followed by a cure baking in a disc oven in a nitrogen gas atmosphere according to a special baking program. The aligning structure 6, like the V-groove structure in the silicon disc of 0.75 Tm, can be patterned with BCB as a mask, at which preferably three masks consequently must be used. During the subsequent component manufacturing a waveguide chip is sawn out of the silicon disc through a suitable standard method, when the disc first then is placed into a tool intended for compression moulding. The V-grooves of the silicon disc is in this instance adapted so that the pins of the mould for shaping of the holes 7 for the guide pins 8 of the MT connector are pressed against these. In this way the quality technology photo lithographic technique can be used for the alignment of the guide pins of the connector with the waveguides. Respective BCB plastic is used for the waveguides and for the encapsulating of the waveguides and for shaping of the optical interface together with the silicon. The last stage in the manufacturing of components is polishing of the interface 9, silicon and plastic (BCB) together, which can be performed with a conventional polishing technique such as for an MT connector. With an E-beam manufactured lithographic mask 5, see FIG. 2, both straight 10, splitter 11 and directional coupler patterns 12 can be produced. FIG. 2 shows a part of an E-beam mask 5 with several different patterns. The division between waveguides in the end surfaces can be 250 Tm, whereby the size of the chip should be adapted to, for example, the mould space of a transfer press. The bending radius used in a Y-splitter and a directional coupler can be chosen to be around 30 mm. The directional couplers can have widths of between 6 and 10 Tm and different lengths and separation distances. A typical core layer thickness could be 7 Tm.

A splitter/distributor can then be connected to a connection connector. Both encapsulated and non-encapsulated waveguides have been investigated concerning optical characteristics. The waveguide's SM characteristic has been investigated for different batches of BCB on naked chips, where it has been possible to show suitable reproducibility. A preliminary aging test has also been performed and it has shown that the SM characteristics can be retained for at least one year for non encapsulated waveguides. Attenuation has been measured to be approximately 0.6 dB/cm in "cut back measurements" on a multimode waveguide.

Figure 3:
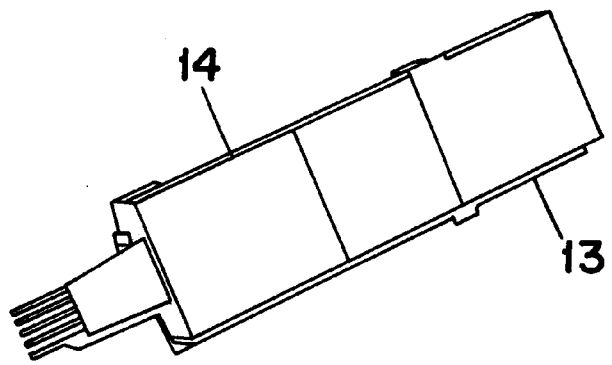
FIG. 3 shows an encapsulated splitter module according to the invention connected with a ribbon fibre connection connector.

FIG. 3 shows an encapsulated direction coupler 13 connected to an optical fibre connection connector, a so-called MT connector 14. A transfer moulding process is used to encapsulate the waveguide structures and to form an optical MT interface. The material used should be a heat curing plastic containing silicon. In order to arrange the direction of the waveguides in relation to the interface, V-grooves can be etched on the silicon substrate with a standard process, for example etching with KOH. In the moulding tool these V-grooves are pressed against metal pins and consequently form the precise holes for the MT interface's guide pins. In this case the directional precision depends on the accuracy in the lithographic method for patterning of the waveguides and on the KOH etching for the V grooves which make the mechanical stability of the plastic material less important. This technique has a potential to achieve single mode performance, i.e. around ±0.5 Tm direction precision. Polishing of the MT interface with BCB waveguides on silicon carriers was performed with a modification of the standard method used for optical connection connectors.

In order to evaluate the so-called BCB waveguides, optical loss measurements were performed on both encapsulated and non-encapsulated straight waveguides while the directional coupler structures were also evaluated optically. The optical losses for different waveguide widths were measured in a spectrum analysis in the wavelength region 0.6–1.6 Tm. The light from a white light source was butt-connected here to the waveguide with the use of a single mode fibre with, for example, an index-adapted gel. At the output the BCB waveguide was connected to a multimode fibre (NA=0.25) with the use of an index-adapted gel.

FIG. 4 shows a diagram for waveguides wherein the in- and output connection losses are added. For straight waveguides with widths up to 12 Tm the single mode performance was determined. A typical curve for the optical losses as a function of wavelengths for a 6 Tm waveguide are shown in the figure. The loss measurements of the encapsulated straight waveguide with polished end surfaces gave almost the same losses as for non-encapsulated waveguides. FIGS. 5A and 5B shows the evaluation of directional coupler structures, whereby the measurements shown together with other measurements show that the developed waveguide concept can well separate wavelengths 1330 and 1550. In the figures only an example of the results from the characterization of the directional couplers is given. The directional couplers have the same reciprocal action lengths but different distances between the waveguides in the connecting region. For each directional coupler, light is transmitted in one of the two input waveguides. The optical effect was measured from the same channel waveguide, see FIG. 5A and from the other waveguide, see FIG. 5B. The results are shown as a function of the waveguide separation. In FIGS. A and B it is shown that the directional connector with a waveguide separation of 5.9 Tm functions like a VDM filter which can differentiate wavelengths of 1.31 Tm and 1.53 Tm in two different output exits. As a conclusion it can be said that through the use of BCB waveguides for optical passive branch arrangements, single mode performance can be achieved with uncomplicated standard methods, waveguides can be used as straight waveguides, power dividers and VDM filters with or without connected active components and can permit plastic encapsulation and standard methods for interface polishing.

We claim:

1. Optoelectrical component with waveguides connectable to connecting connectors, comprising a layer of a first material on a silicon substrate, a waveguide pattern of a second material on the layer of first material, and a further layer of the first material on the waveguide pattern and in the space around the waveguide pattern, wherein the waveguide pattern is surrounded by the first material, wherein the first material is benzocyclobutene polymer (BCB) and the second material is photopatternable benzocyclobutene polymer (BCB).

2. Optoelectrical component according to claim 1, wherein at least one active component is connected to a waveguide.

3. Optoelectrical component according to claim 1, wherein the waveguide pattern comprises at least one splitter.

4. Optoelectrical component according to claim 1, wherein the waveguide pattern comprises at least one directional coupler.

5. Method for producing an optoelectrical component with waveguides connectable to a connection connector, comprising forming a layer of a first material on a silicon substrate, forming a layer of a second material on the layer of first material, removing portions of the second material using a mask with a waveguide pattern, thereby forming a waveguide pattern on the first material, and forming a further layer of the first material on the waveguide pattern and in the space around the waveguide pattern, whereby the waveguide pattern is surrounded by the first material and end surfaces of the optoelectrical component are arranged to be connectable through grinding and polishing, wherein the first material is benzocyclobutene polymer (BCB) and the second material is photopatternable benzocyclobutene polymer (BCB).

\* \* \* \* \*